US012187451B1

(12) United States Patent
Snape

(10) Patent No.: US 12,187,451 B1
(45) Date of Patent: Jan. 7, 2025

(54) DUAL SPEED PLANETARY GEAR SYSTEM FOR CONVERTIBLE ENGINES

(71) Applicant: RTX CORPORATION, Farmington, CT (US)

(72) Inventor: Nathan A. Snape, Tolland, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/458,594

(22) Filed: Aug. 30, 2023

(51) Int. Cl.
  *B64D 35/02* (2024.01)
  *B64D 27/10* (2006.01)
  *F02C 7/36* (2006.01)
  *F16H 3/78* (2006.01)

(52) U.S. Cl.
  CPC ............ *B64D 35/02* (2013.01); *B64D 27/10* (2013.01); *F02C 7/36* (2013.01); *F16H 3/78* (2013.01); *F16H 2200/0034* (2013.01); *F16H 2200/2005* (2013.01); *F16H 2200/2033* (2013.01)

(58) Field of Classification Search
  CPC ........... B64D 35/02; B64D 27/10; F02C 7/36; F16H 3/78; F16H 2200/0034; F16H 2200/2005; F16H 2200/2033
  See application file for complete search history.

(56) References Cited

U.S. PATENT DOCUMENTS

| 11,028,905 | B2 | 6/2021 | Finke et al. | |
| 2019/0376596 | A1* | 12/2019 | Clark | F16H 57/0427 |
| 2023/0203993 | A1 | 6/2023 | Molesini et al. | |

* cited by examiner

*Primary Examiner* — Valentina Xavier
(74) *Attorney, Agent, or Firm* — Carlson, Gaskey & Olds, P.C.

(57) ABSTRACT

A gear carrier drives a propulsor. Two ring gears engage with respective tooth locations on planet gears. A first gear tooth set on a ring lock selectively engage with a first ring gear and a second gear tooth set on a ring lock selectively engage with a second ring gear. When the first gear tooth set on the ring lock engages the first ring gear, rotation of the first ring gear stops, and the planet gears drive the carrier at a first speed. When the second ring lock gear tooth set engages the second ring gear, rotation of the second ring gear stops and the planet gear drives the carrier at a second speed which is different than the first speed. An aircraft and a method are also disclosed.

20 Claims, 6 Drawing Sheets

DUAL SPEED PLANETARY GEAR SYSTEM FOR CONVERTIBLE ENGINES

BACKGROUND OF THE INVENTION

This application relates to a planetary gear drive for a gas turbine engine propulsor which can selectively operate at two speed.

Gas turbine engines are known, and typically include a propulsor for providing propulsion air. The propulsor may also deliver air into a core engine where it moves into a compressor section. The air is compressed and then delivered into a combustor where it is mixed with fuel and ignited. Products of this combustion pass downstream over turbine rotors, driving them to rotate.

The turbine rotors in turn drive propulsor and compressor rotors. Historically the turbine rotor rotated at a single speed with the propulsor rotor. However, more recently, a gear reduction has been included between the two such that the propulsor can operate a lower speed than the turbine. This improves efficiency.

Gas turbine engines are known for various types of aircraft. Many gas turbine engines are utilized to drive standard aircraft. However, gas turbine engines are also utilized to drive vertical takeoff and land ("VTOL") aircraft. In such aircraft there is a propulsor driving the aircraft forward, however, there are also lift propellers which operate to lift the aircraft and lower the aircraft back to land.

SUMMARY OF THE INVENTION

In a featured embodiment, a gas turbine engine includes a propulsor having a propulsor input shaft. A turbine rotor drives a turbine shaft. The turbine shaft drives the propulsor input shaft through a gear reduction. The gear reduction is a planetary gear system having a sun gear rotating with the turbine shaft and engaging and driving a plurality of planet gears. The planet gears rotate with a gear carrier. The gear carrier drives the propulsor input shaft. There are at least two ring gears in engagement with a respective one of two tooth locations on the planet gears. A ring lock has a pair of gear tooth sets. A first of the gear tooth sets on the ring lock selectively engaged with a first ring gear tooth set and a second of the gear tooth sets on the ring lock selectively engageable with a second ring gear tooth set. The ring lock is constrained against rotation, such that when the first gear tooth set on the ring lock engages the first ring gear tooth set, rotation of the first ring gear is stopped, and the planet gears drive the carrier at a first speed to in turn rotate the propulsor. When the second ring lock gear tooth set engages the second ring gear tooth set, rotation of the second ring gear stops and the planet gear drives the carrier to in turn rotate the propulsor at a second speed which is different than the first speed.

In another embodiment according to the previous embodiment, a sync idler moves with the ring lock to engage one of the first and second ring gears as the gear tooth sets are coming into engagement.

In another embodiment according to any of the previous embodiments, the sync idler moves with the ring lock and has a friction clutch that allows it to adjust a position relative to the ring lock during movement.

In another embodiment according to any of the previous embodiments, an actuator is provided for moving the ring lock to align the ring lock first and second gear tooth sets with the respective first ring gear and second ring gear tooth sets.

In another embodiment according to any of the previous embodiments, the propulsor is a fan rotating within a fan case.

In another embodiment according to any of the previous embodiments, the turbine shaft further driving a lift rotor through a clutch.

In another embodiment according to any of the previous embodiments, the turbine shaft further driving a lift rotor through a clutch.

In another embodiment according to any of the previous embodiments, the first speed is slower than the second speed and the gear reduction is moved to the first speed when the gas turbine engine is being operated at an idle condition.

In another featured embodiment, an aircraft includes a fuselage and wings, and a gas turbine engine. The gas turbine engine has a propulsor having a propulsor input shaft. A turbine rotor drives a turbine shaft. The turbine shaft drives the propulsor input shaft through a gear reduction. The gear reduction is a planetary gear system having a sun gear rotating with the turbine shaft and engaging and driving a plurality of planet gears. The planet gears rotate with a gear carrier. The gear carrier drives the propulsor input shaft. There are at least two ring gears in engagement with a respective one of two tooth locations on the planet gears. A ring lock has a pair of gear tooth sets. A first of the gear tooth sets on the ring lock selectively engage with a first ring gear tooth set and a second of the gear tooth sets on the lock ring selectively engageable with a second ring gear tooth set. The ring lock is constrained against rotation, such that when the first gear tooth set on the ring lock engages the first ring gear tooth set, rotation of the first ring gear is stopped, and the planet gear drives the carrier at a first speed to in turn rotate the propulsor. When the second ring lock gear tooth set engages the second ring gear tooth set, rotation of the second ring gear stops and the planet gear drives the carrier to in turn rotate the propulsor at a second speed which is different than the first speed.

In another embodiment according to any of the previous embodiments, a sync idler moves with the ring lock to engage one of the first and second ring gears as the gear tooth sets are coming into engagement.

In another embodiment according to any of the previous embodiments, the sync idler moves with the ring lock and has a friction clutch that allows it to adjust a position relative to the ring lock during movement.

In another embodiment according to any of the previous embodiments, an actuator is provided for moving the ring lock to align the ring lock first and second gear tooth sets with the respective first ring gear and second ring gear tooth sets.

In another embodiment according to any of the previous embodiments, the propulsor is a fan rotating within a fan case.

In another embodiment according to any of the previous embodiments, the turbine shaft further drives a lift rotor through a clutch.

In another embodiment according to any of the previous embodiments, the turbine shaft further drives a lift rotor through a clutch.

In another embodiment according to any of the previous embodiments, the first speed is slower than the second speed and the gear reduction is moved to the first speed when the gas turbine engine is being operated at an idle condition.

In another featured embodiment, a method includes driving a turbine shaft, and the turbine rotor driving a propulsor input shaft through a gear reduction. The gear reduction has a sun gear rotating with the turbine shaft and engaging and driving a plurality of planet gears. The planet gears rotate with a gear carrier and the gear carrier drive the propulsor input shaft. There are at least two ring gears in engagement with a respective one of two tooth locations on the planet gears. A ring lock is moved having a first ring lock gear tooth set such that the ring lock is engaged with a first ring gear tooth set. The ring lock is moved such that a second lock ring gear tooth set is engaged with a second ring gear tooth set, constraining the ring lock against rotation such that when the first ring lock gear tooth set engages the first ring gear tooth set, rotation of the first ring gear is stopped, and the planet gear drives the carrier at a first speed to in turn rotate the propulsor. When the second ring lock gear tooth set engages the second ring gear tooth set, rotating of the second ring gear is stopped and the planet gear drives the carrier to in turn rotate the propulsor at a second speed which is different than the first speed.

In another embodiment according to any of the previous embodiments, the turbine shaft further selectively driving a lift rotor through a clutch.

In another embodiment according to any of the previous embodiments, when the propulsor is driven at the first speed the lift rotor is rotated, and when the propulsor is driven at the second speed the clutch is opened and the lift rotor is not rotated.

In another embodiment according to any of the previous embodiments, the first speed is slower than the second speed and the gear reduction is moved to the first speed when the gas turbine engine is being operated at an idle condition.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
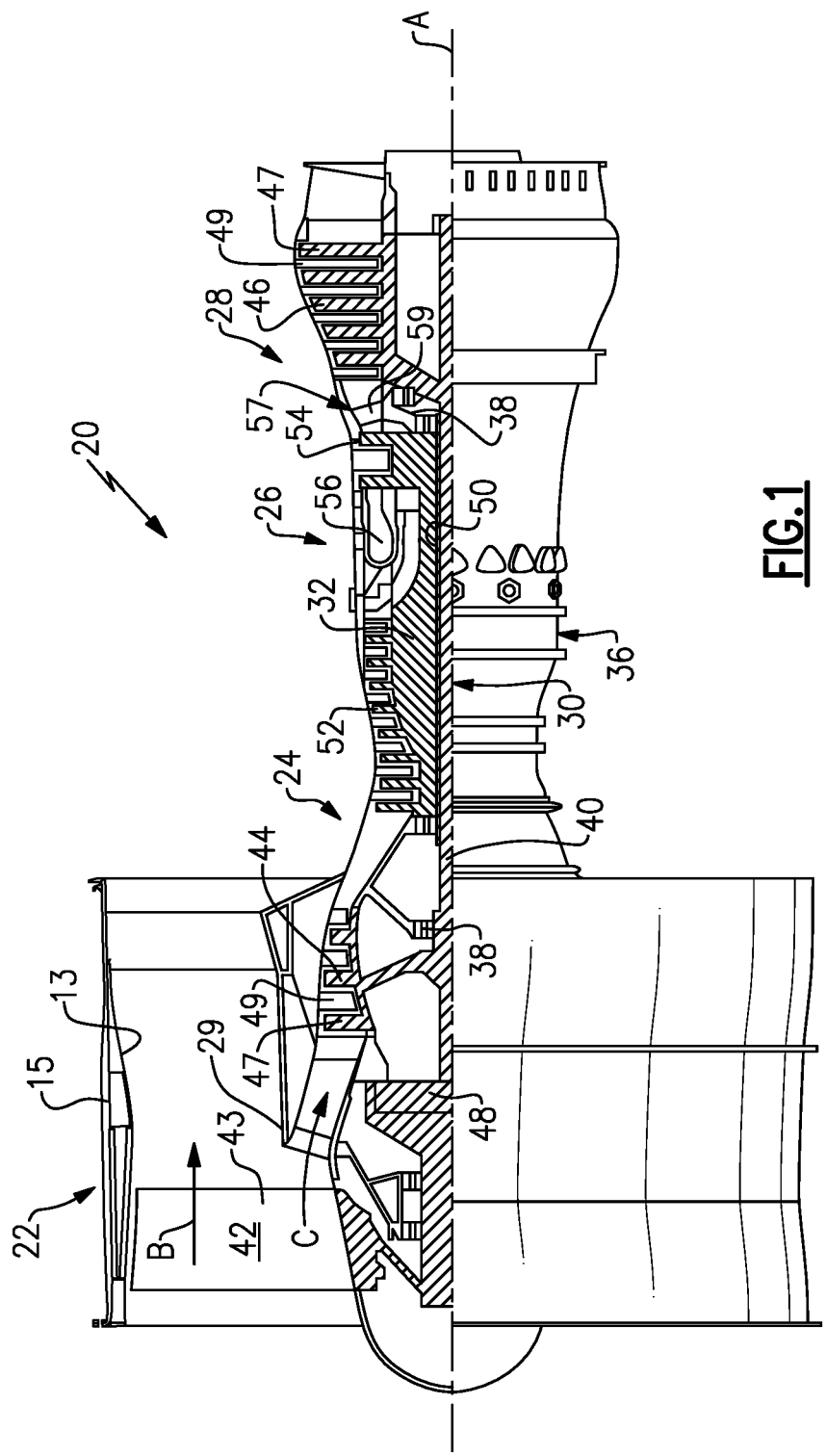
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram° R)/(518.7° R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

While the engine is represented above as a commercial type high bypass gas turbine engine, the teachings of this disclosure could extend to many other types of engines including a short take-off and vertical landing aircraft engine or an engine utilizing a propeller as the propulsor. Engines which utilize a gear reduction such as shown in FIG. 1 have achieved wide success. However, it will sometimes be desirable to have the option of operating the propulsor at distinct speeds.

Figure 2:
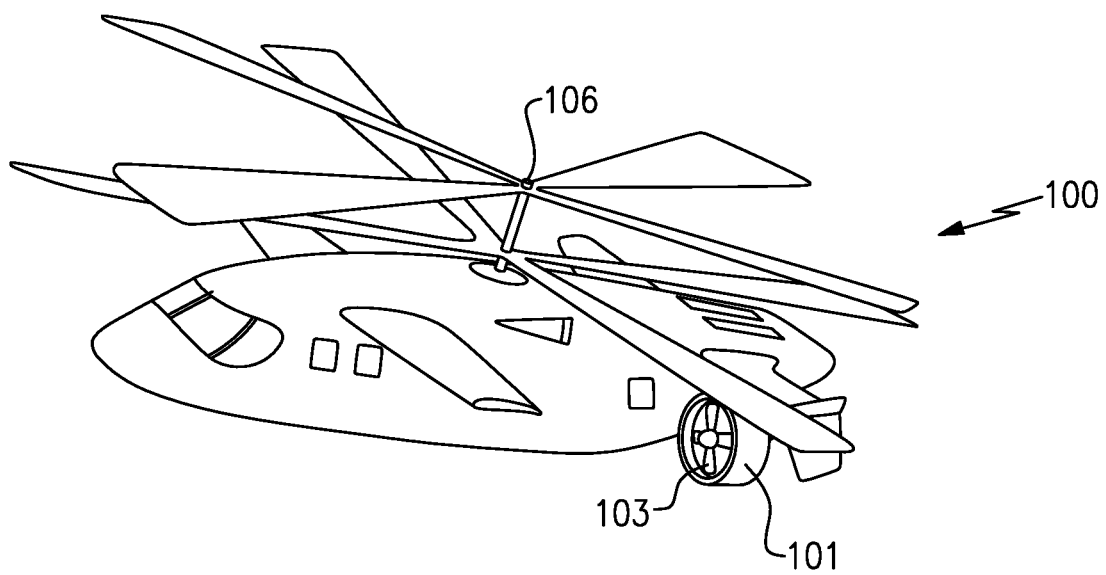
FIG. 2 shows an aircraft application.

FIG. 2 shows a vertical takeoff and land aircraft 100. Gas turbine engines 101 are provided with propulsors 103, such as a fan. The gas turbine engine 101 is also provided with a transmission that drives a lift propeller 106.

Figure 3A:
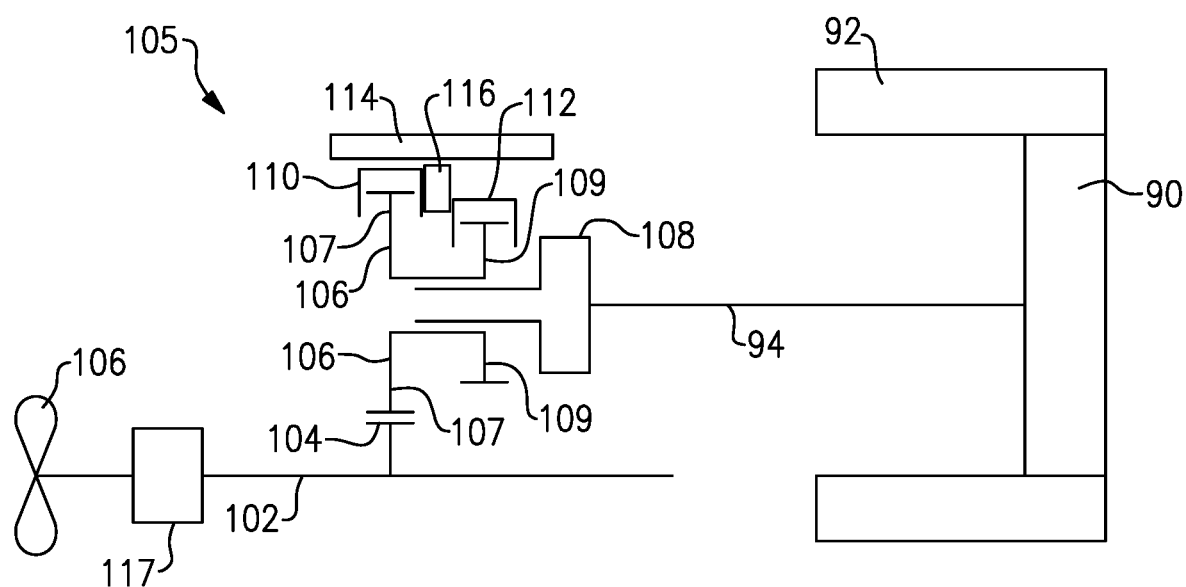
FIG. 3A shows a dual speed gear reduction for a gas turbine engine.

Thus, FIG. 3A shows a gear reduction 105 which is operable at two distinct speeds. A turbine input shaft 102 drives a sun gear 104. Sun gear 104 is engaged with planet gears 111. The planet gears 106 have two distinct gear teeth areas 107 and 109. When area 107 is in engagement with a stationary ring gear 110 the gear reduction will drive an output shaft 94 at a slower speed. On the other hand, if the gear area 109 is engaged with a static ring gear 112 the shaft 94 will be driven at a higher speed. Shaft 94 is shown driving a propulsor 90 which is received within a fan casing 92. However, as mentioned above, this disclosure could benefit many other types of gas turbine engine propulsors.

As shown, the shaft 102 also drives a lift propeller 106 through a clutch 117.

There are a plurality of planet gears 111 and they rotate with a carrier 108. The ring gears 110 and 112 are shown along with a ring lock 114. Ring lock 114 is constrained against rotation. A sync idler 116 selectively will slow/stop rotation of one of the ring gears 110 and 112. If the lock ring 114 is not locking one of the ring gears 110 and 112 they will rotate. Under such conditions the propulsor 90 will be driven at an intermediate speed.

Figure 3B:
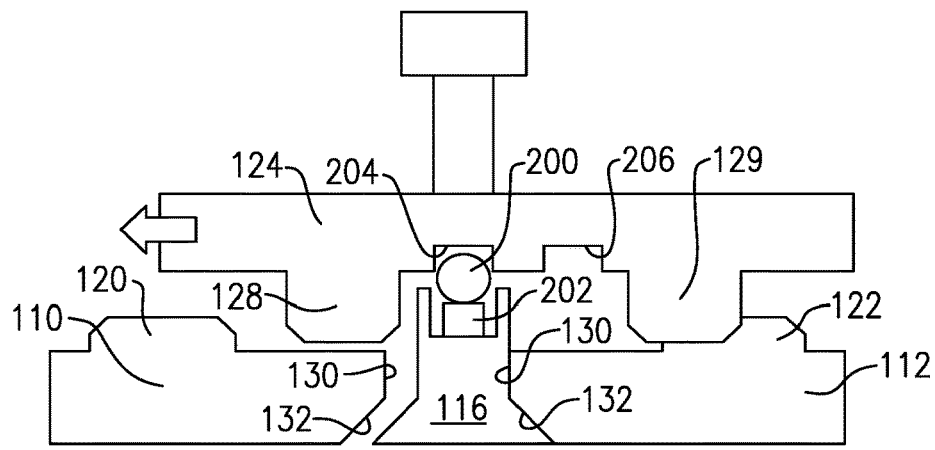
FIG. 3B shows a clutching mechanism in a first position.

FIG. 3B shows the clutch mechanism having the ring lock 124 with two sets of gear teeth 128 and 129. In the FIG. 3B position one can see the gear teeth set 129 on the ring lock 124 are engaged with gear teeth 122 on a first ring gear 112. Thus, ring gear 112 is constrained against rotation. It will thus drive the planet gears, to in turn drive the carrier at a first speed.

As shown, a sync idler 116 has a triangular surface in engagement with the triangular surface 132 on the ring gear 112 and an engagement with a flat surface 130. A friction clutch includes a ball 200 biased by a spring pack 202 into a first notch 204. As shown, a second notch 206 is spaced from the first notch 204.

Figure 3D:
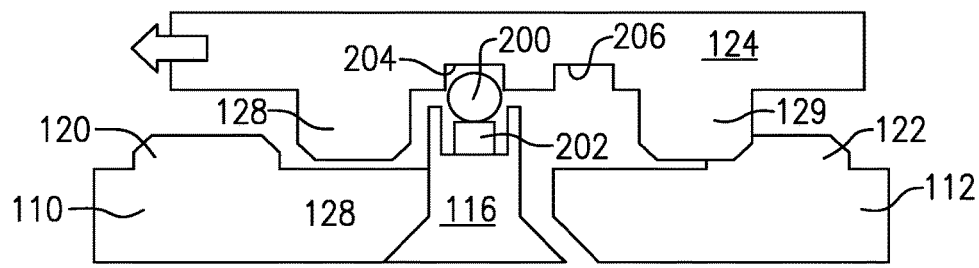
FIG. 3D shows a subsequent position.
Figure 3E:
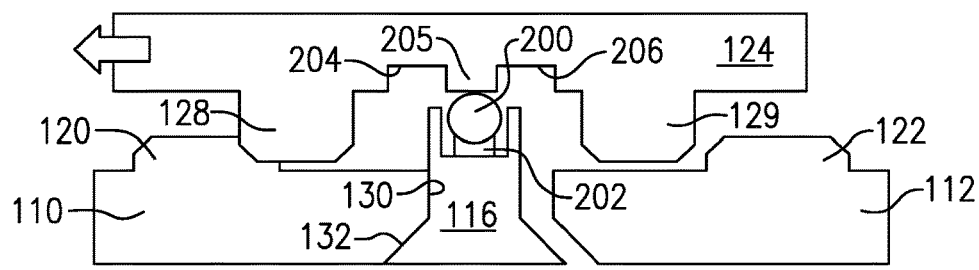
FIG. 3E shows yet another subsequent position.
Figure 3G:
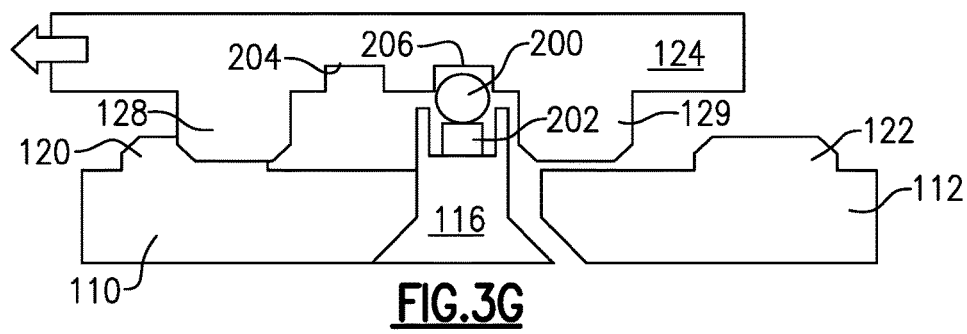
FIG. 3G shows yet another position.
Figure 3C:
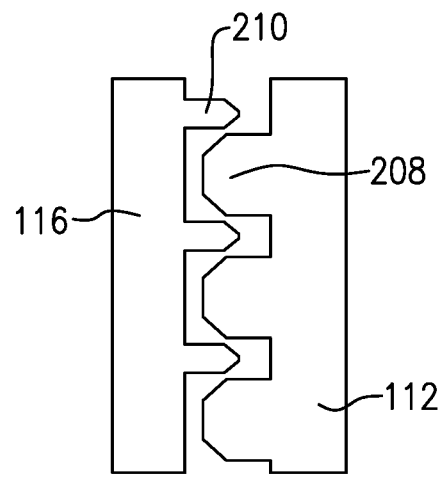
FIG. 3C shows a detail of the clutch mechanism in the first position.

As shown in FIG. 3C, the sync idler 116 has teeth 210 which are engaged between teeth 208 on an axial face of the ring gear 112. In this manner, the sync idler 116 has previously stopped rotation of the ring gear 112 such that teeth 129 can engage the teeth 122.

As shown in FIG. 3D, the ring lock 124 is now moving towards the left to engage the ring gear 110. The sync idler 116 moves in the notch 204 to the position of FIG. 3D. In this position the sync idler begins to slow rotation of the ring gear 110.

As shown in FIG. 3E, the sync idler 116 has now moved such that the friction clutch has now moved out of the notch 204 to an intermediate land 205. In this position the sync idler 116 teeth 210 begin to engage teeth on the ring gear 110 slowing and then stopping rotation such that the teeth 128 can engage the teeth 120.

Figure 3F:
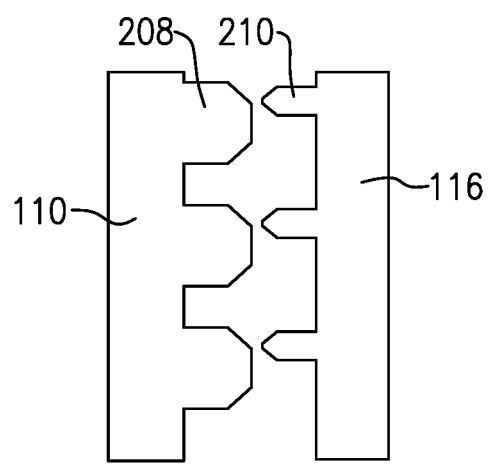
FIG. 3F shows a detail of the clutch in the FIG. 3E position.

FIG. 3F shows the teeth 210 and the teeth 208 in this position.

FIG. 3G now shows the ring lock 124 having moved further such that the gear teeth set 128 is fully engaged with the gear teeth set 120. In this position the ring gear 110 cannot rotate and drives the planet gears and thus the carrier at a second speed.

While the transmission is shown driving a lift propeller, the teachings of this disclosure could also extend to a standard gas turbine engine operating on an aircraft without any lift propeller. As an example, a lower speed might be utilized by the two speed gear reduction at certain conditions of an associated aircraft such as when the engine is being operated at idle.

Figure 4A:
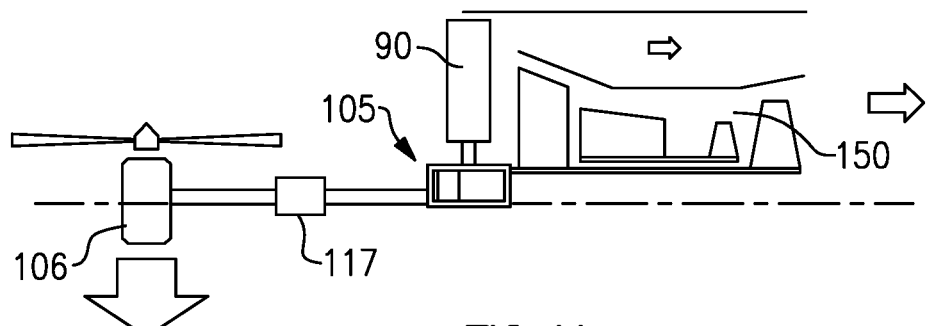
FIG. 4A shows a first position.

FIG. 4A shows the gear reduction 105 driving a fan 90 and a lift propeller 106 through the clutch 117 at a first low speed position as shown in FIG. 4A, the lift rotor 106 is being driven, with the fan 90 operating at a slower speed. Thus, the aircraft can be lifted into the air. This would be associated with the position of FIG. 3C.

Figure 4B:
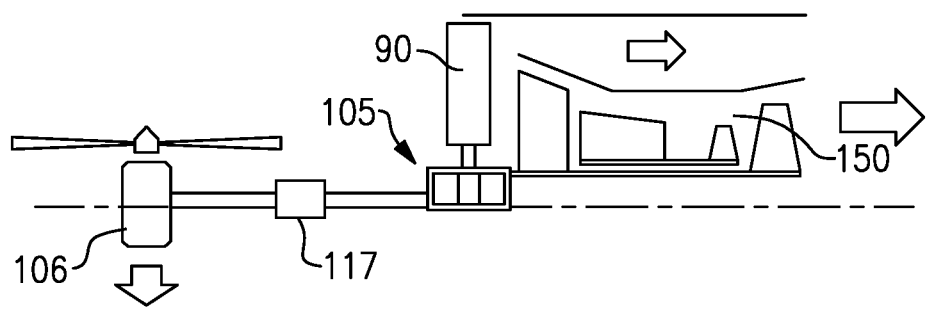
FIG. 4B shows a second optional position.

FIG. 4B shows a position similar to that shown in FIG. 3B. The lift rotor 106 is no longer being driven at a high speed. Further, the fan 90 has its speed increasing.

Figure 4C:
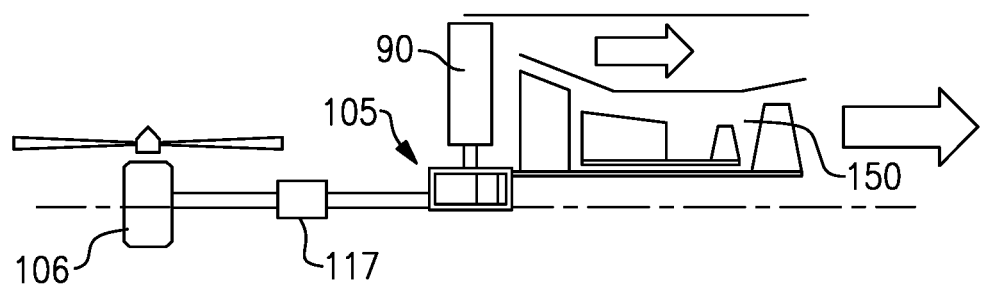
FIG. 4C shows a third optional position.

In FIG. 4C, which corresponds to the position of FIG. 3D, the clutch is now open and the lift rotor 106 is no longer being driven. The gear reduction 105 is now in the FIG. 3D position and the fan 90 is being driven at a high speed.

A gas turbine engine under this disclosure could be said to include a propulsor having a propulsor input shaft. A turbine rotor drives a turbine shaft. The turbine shaft drives the propulsor input shaft through a gear reduction. The gear reduction is a planetary gear system having a sun gear rotating with the turbine shaft and engaging and driving a plurality of planet gears. The planet gears rotate with a gear carrier. The gear carrier drives the propulsor input shaft. There are at least two ring gears in engagement with a respective one of two tooth locations on the planet gears. A ring lock has a pair of gear tooth sets. A first of the gear tooth sets on the ring lock selectively engage with a first ring gear tooth set and a second of the gear tooth sets on the ring lock selectively engageable with a second ring gear tooth set, the ring lock constrained against rotation, such that when the first gear tooth set on the ring lock engages the first ring gear tooth set, rotation of the first ring gear is stopped, and the planet gears drive the carrier at a first speed to in turn rotate the propulsor, and when the second ring lock gear tooth set engages the second ring gear tooth set, rotation of the second ring gear stops and the planet gear drives the carrier to in turn rotate the propulsor at a second speed which is different than the first speed.

A method under this disclosure could be said to include driving a turbine shaft. The turbine rotor drives a propulsor input shaft through a gear reduction. The gear reduction has a sun gear rotating with the turbine shaft and engaging and driving a plurality of planet gears. The planet gears rotate with a gear carrier and the gear carrier drives the propulsor input shaft. There are at least two ring gears in engagement with a respective one of two tooth locations on the planet gears. Moving a ring lock having a first ring lock gear tooth set such that the ring lock is engaged with a first ring gear tooth set, moving the ring lock such that a second lock ring gear tooth set is engaged with a second ring gear tooth set, constraining the ring lock against rotation such that when the first ring lock gear tooth set on the ring lock engages the first ring gear tooth set, rotation of the first ring gear is stopped, and the planet gear drives the carrier at a first speed to in turn rotate the propulsor, and when the second ring lock gear tooth set engages the second ring gear tooth set, rotating of the second ring gear is stopped and the planet gear drives the carrier to in turn rotate the propulsor at a second speed which is different than the first speed.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising:
   a propulsor having a propulsor input shaft;
   a turbine rotor driving a turbine shaft, said turbine shaft driving said propulsor input shaft through a gear reduction, the gear reduction being a planetary gear system having a sun gear rotating with the turbine shaft and engaging and driving a plurality of planet gears, said planet gears rotating with a gear carrier, the gear carrier driving the propulsor input shaft; and
   there being at least two ring gears in engagement with a respective one of two tooth locations on said planet gears; and
   a ring lock having a pair of gear tooth sets, a first of said gear tooth sets on said ring lock selectively engaged with a first ring gear tooth set and a second of said gear tooth sets on said ring lock selectively engageable with a second ring gear tooth set, said ring lock constrained against rotation, such that when said first gear tooth set on said ring lock engages said first ring gear tooth set, rotation of said first ring gear is stopped, and said planet gears drive said carrier at a first speed to in turn rotate said propulsor, and when said second ring lock gear tooth set engages said second ring gear tooth set, rotation of said second ring gear stops and said planet gear drives said carrier to in turn rotate the propulsor at a second speed which is different than the first speed.

2. The gas turbine engine as set forth in claim 1, wherein a sync idler moves with the ring lock to engage one of said first and second ring gears as the gear tooth sets are coming into engagement.

3. The gas turbine engine as set forth in claim 2, wherein the sync idler moving with the ring lock and having a friction clutch that allows it to adjust a position relative to the ring lock during movement.

4. The gas turbine engine as set forth in claim 1, wherein an actuator is provided for moving the ring lock to align the ring lock first and second gear tooth sets with the respective first ring gear and second ring gear tooth sets.

5. The gas turbine engine as set forth in claim 1, wherein the propulsor is a fan rotating within a fan case.

6. The gas turbine engine as set forth in claim 5, wherein the turbine shaft further driving a lift rotor through a clutch.

7. The gas turbine engine as set forth in claim 1, wherein the turbine shaft further driving a lift rotor through a clutch.

8. The gas turbine engine as set forth in claim 1, wherein the first speed is slower than the second speed and the gear reduction is moved to the first speed when the gas turbine engine is being operated at an idle condition.

9. An aircraft comprising:
   a fuselage and wings, and a gas turbine engine;
   the gas turbine engine having a propulsor having a propulsor input shaft;
   a turbine rotor driving a turbine shaft, said turbine shaft driving said propulsor input shaft through a gear reduction, the gear reduction being a planetary gear system having a sun gear rotating with the turbine shaft and engaging and driving a plurality of planet gears, said planet gears rotating with a gear carrier, the gear carrier driving the propulsor input shaft; and
   there being at least two ring gears in engagement with a respective one of two tooth locations on said planet gears; and
   a ring lock having a pair of gear tooth sets, a first of said gear tooth sets on said ring lock selectively engaged with a first ring gear tooth set and a second of said gear tooth sets on said lock ring selectively engageable with a second ring gear tooth set, said ring lock constrained against rotation, such that when said first gear tooth set on said ring lock engages said first ring gear tooth set, rotation of said first ring gear is stopped, and said planet gear drives said carrier at a first speed to in turn rotate said propulsor, and when said second ring lock gear tooth set engages said second ring gear tooth set, rotation of said second ring gear stops and said planet gear drives said carrier to in turn rotate the propulsor at a second speed which is different than the first speed.

10. The aircraft as set forth in claim 9, wherein a sync idler moves with the ring lock to engage one of said first and second ring gears as the gear tooth sets are coming into engagement.

11. The aircraft as set forth in claim 10, wherein the sync idler moving with the ring lock and having a friction clutch that allows it to adjust a position relative to the ring lock during movement.

12. The aircraft as set forth in claim 9, wherein an actuator is provided for moving the ring lock to align the ring lock first and second gear tooth sets with the respective first ring gear and second ring gear tooth sets.

13. The aircraft as set forth in claim 9, wherein the propulsor is a fan rotating within a fan case.

14. The aircraft as set forth in claim 13, wherein the turbine shaft further driving a lift rotor through a clutch.

15. The aircraft as set forth in claim 9, wherein the turbine shaft further driving a lift rotor through a clutch.

16. The aircraft as set forth in claim 9, wherein the first speed is slower than the second speed and the gear reduction is moved to the first speed when the gas turbine engine is being operated at an idle condition.

17. A method comprising:
   driving a turbine shaft, and said turbine rotor driving a propulsor input shaft through a gear reduction, the gear reduction having a sun gear rotating with the turbine shaft and engaging and driving a plurality of planet gears, said planet gears rotating with a gear carrier and the gear carrier driving the propulsor input shaft; and there being at least two ring gears in engagement with a respective one of two tooth locations on said planet gears; and moving a ring lock having a first ring lock gear tooth set such that said ring lock is engaged with a first ring gear tooth set, moving said ring lock such that a second lock ring gear tooth set is engaged with a second ring gear tooth set, constraining the ring lock against rotation such that when said first ring lock gear tooth set engages said first ring gear tooth set, rotation of said first ring gear is stopped, and said planet gear drives said carrier at a first speed to in turn rotate said propulsor, and when said second ring lock gear tooth set engages said second ring gear tooth set, rotating of said second ring gear is stopped and said planet gear drives said carrier to in turn rotate the propulsor at a second speed which is different than the first speed.

18. The method as set forth in claim 17, wherein the turbine shaft further selectively driving a lift rotor through a clutch.

19. The method as set forth in claim 18, wherein when said propulsor is driven at the first speed the lift rotor is rotated, and when said propulsor is driven at the second speed the clutch is opened and the lift rotor is not rotated.

20. The method as set forth in claim 17, wherein the first speed is slower than the second speed and the gear reduction is moved to the first speed when the gas turbine engine is being operated at an idle condition.

\* \* \* \* \*